United States Patent [19]

DuPont et al.

[11] Patent Number: 4,534,998
[45] Date of Patent: Aug. 13, 1985

[54] CONDUCTIVE COATING PROCESS

[75] Inventors: Preston S. DuPont, Northridge; Robert E. Ritter, Palos Verdes; John P. Stafford, Culver City, all of Calif.

[73] Assignee: Hughes Aircraft Company, El Segundo, Calif.

[21] Appl. No.: 381,125

[22] Filed: May 24, 1982

[51] Int. Cl.³ .......................... B05D 1/02; B05D 5/12
[52] U.S. Cl. ................................. 427/122; 427/385.5; 427/386; 427/387; 427/394; 427/393.1; 427/421; 361/218; 361/220; 252/511; 428/244; 428/252; 428/216; 428/218
[58] Field of Search ...................... 427/122, 385.5, 386, 427/387, 394, 421, 393.1, 389.8, 389.9; 361/218, 220; 252/511; 428/922, 244, 252, 408, 216, 218

[56] References Cited

U.S. PATENT DOCUMENTS 2,866,057 12/1958 Peck ..................... 427/122
3,509,088 4/1970 Dalton .................. 427/122
3,751,620 8/1973 Yuasa ................... 338/211
3,808,403 4/1974 Kanaya et al. ......... 252/511
3,999,040 12/1976 Ellis ..................... 252/511
4,178,405 12/1979 Berkowitz et al. ..... 427/122
4,273,797 6/1981 Akashi et al. .......... 427/122
4,382,881 5/1983 Levy .................... 252/511

OTHER PUBLICATIONS

Kenrich Petrochemicals, Inc. Bulletin No. KR-0278-7, Rev. #2, Feb. 1978.

Primary Examiner—Richard Bueker
Attorney, Agent, or Firm—W. J. Benman, Jr.; A. W. Karambelas

[57] ABSTRACT

Conductive coating (20) is produced by the process of first mixing by high shear mixing a mixture of 0.03 parts per weight of carbon black together with 0.003 to 0.01 parts per weight of wetting agent and 20 parts of solvent, and further mixing in by low shear mixing ½ to 1 part per weight of thermosetting resin. Prior to application this is then sprayed into place on the substrate. In this particular case, the substrate is exterior face sheet (12) of honeycomb structure (10) which may serve as part of a spacecraft, to electrically conduct away surface charges.

7 Claims, 1 Drawing Figure

U.S. Patent  Aug. 13, 1985  4,534,998
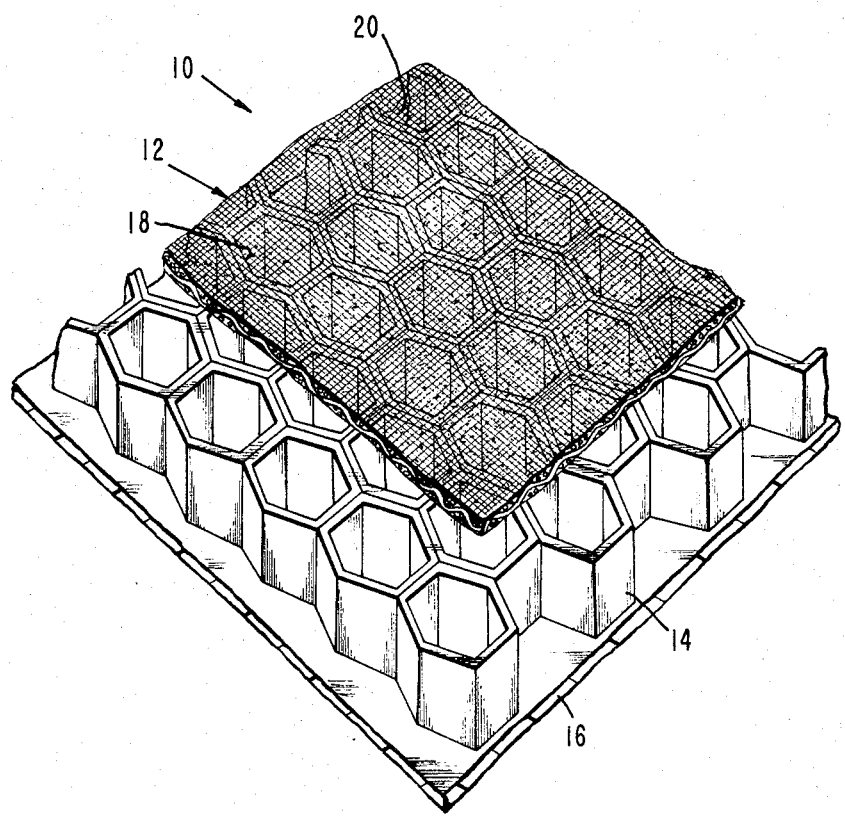

CONDUCTIVE COATING PROCESS

TECHNICAL FIELD

This invention is directed to the process for providing a conductive coating to reduce the charging of a dielectric surface to reduce potential gradients thereon. The conductive coating conducts away the charge. The described preferred embodiment is the application of conductive coatings on spacecraft dielectric surfaces, and the coating can also be used on other non-spacecraft surfaces.

BACKGROUND OF THE INVENTION

During the past few years substantial evidence has correlated anomalous spacecraft behavior with differential high voltage charging due to magnetospheric plasma particle interaction. Spacecraft charging effects range from the nuisance category of telemetry anomalies through antenna pointing errors that have resulted in a temporary loss of communications. In order to prevent these undesirable effects, it is necessary to prevent the build-up of large potential gradients on dielectric surfaces, because the large potential may arc to a ground point. The potential build-up on a dielectric surface in a given energetic charged particle environment is directly proportional to the surface resistivity of the exposed dielectric. Furthermore, the energy available in the discharge of such surfaces is proportional to the square of surface resistivity. Since surface resistivity of many dielectrics used in spacecraft construction are typically in the range of from $10^{12}$ to $10^{17}$ ohms per square, the amount of energy which can be coupled into sensitive electronic components can be substantial. Discharge energies of many millijoules are possible. Thus, a means for providing low rate discharge of such surface charging is a preventive necessity against potentially harmful electrostatic discharges.

Most conductive coatings in the prior art were applied either by vacuum deposition or as conductive paint. The deposition of a metal from the vapor form in vacuum is not suitable for many spacecraft assemblies. Furthermore, it is not readily repairable, should there be a problem. With respect to conductive paints, the resistivities are not uniform or repeatable. Furthermore, conductive paint is very much heavier. Thus, there is need for a proper discharge coating and application method.

SUMMARY OF THE INVENTION

In order to aid in the understanding of this invention, it can be stated in essentially summary form that it is directed to the mixing and spraying steps to provide a conductive coating. The conductive coating comprises a sprayed-on solution of epoxy resin with its hardner in an acetone solution and with carbon black mixed in.

It is thus a purpose and advantage of this invention to provide a method for producing a conductive coating which can be sprayed onto a dielectric article to increase its surface conductivity.

It is a further purpose and advantage to provide a method for applying the conductive coating wherein the coating is of very light weight, has good resistivity control and has satisfactory outgassing characteristics so that it can be successfully used in spacecraft coating, without an undue weight penalty and can be employed in space without undesirable results.

It is a further purpose and advantage of this invention to provide a method which produces a thin, light, space compatible conductive coating for application on spacecraft dielectric surfaces to prevent charge build-up and subsequent discharge which could be detrimental to spacecraft operation.

Other purposes and advantages of this invention will become apparent from a study of the following portion of this specification, the claims and the attached drawing.

BRIEF DESCRIPTION OF THE DRAWING

The single FIGURE of the drawing is an isometric view of a honeycomb structure, with parts broken away and parts taken in section.

DETAILED DESCRIPTION OF THE INVENTION

In the drawing, honeycomb structure 10 is illustrated as a structure which may be employed in a spacecraft or other location. Honeycomb structure 10 is made up of exterior face sheet 12, honeycomb core 14 and interior face sheet 16. In the preferred embodiment, the exterior face sheet 12 and interior face sheet 16 are made of woven Kevlar. Kevlar is the DuPont trademark for a type of aramid which is a generic name coined to describe polyaromatic amids (or aromatic polyamids) and distinguish them from conventional, aliphatic nylons. Aramids are made only by DuPont. The Kevlar aramid fibers have a high strength and compete with glass, carbon, metal and organic fibers in the wide range of plastic, elastomeric and fabric applications. In the present honeycomb structure 10, if desired, the face sheet away from the charged particle plasma can be made of polyimide film. Honeycomb core 14 is preferably an aluminum or aluminum alloy honeycomb. Honeycomb structure 10 is secured together by means of a thermosetting adhesive, such as epoxy. In the present example, exterior face sheet 12 is the face sheet toward the charged particle plasma and is the face sheet to which the conductive coating of this invention is applied.

The exterior surface 18 of exterior face sheet 12 is first prepared by masking or covering the areas on which the conductive coating is undesirable for electrical or mechanical reasons, and cleaned. Cleaning is accomplished by lightly sanding the entire area to be coated. Next, the material which will be applied is prepared and then sprayed on.

In accomplishing the conductive coating in accordance with this invention, an adhesive is mixed with a conductive powder such as carbon black and is applied, tested and cured. The examples below give three different two-part polymer resin systems: epoxy, silicone and urethane. The three examples given below illustrate the manner in which these three polymer resins are employed, and serves as examples for the manner in which other polymer resins may be used.

EXAMPLE 1

Mixture 1 is prepared of a solvent, a conductive powder and a wetting agent. Acetone in the amount of 20 parts by weight is mixed together with 0.03 parts by weight of acetylene carbon black and from 0.003 to 0.01 parts by weight of KR 9S coupling or wetting agent (isopropyl, tridodecylbenzenesulfonyl titanate) purchased from Kenrich Petrochemical Corp., Bayonne, N.J. The coupler, wetting agent is added to help maintain the carbon in suspension, to prevent it from settling to the bottom of the container. The carbon is dispersed in the liquid. These three materials are mixed together in a high shear power blender which has a sufficiently high shear to maintain a one-half to one inch of vortex, showing a good high shear mixing. Mixture 2 is one part of Epon 815 epoxy resin purchased from the Shell Chemical Corporation, or other conventional epoxy, together with its hardener. A suitable room temperature hardener is TETA (triethylenetetramine), mixed with the epoxy resin. The ratio of epoxy resin to resin hardener is in accordance with the adhesive system is use.

Mixture 1 is added to mixture 2 and they are mixed together by means of low shear mixing, such as stirring by a wooden paddle to produce a solution-dispersion.

High shear mixing of mixture 1 is to thoroughly wet the carbon particles with solvent. The low shear mixing together of mixtures 1 and 2 is to prevent complete coating of the carbon particles. If the carbon particles are completely coated with the dielectric adhesive, they would not electrically contact and would not conduct. The resistivity can be controlled by the amount of particle coating in the second mixing operation.

This solution-dispersion is then sprayed onto the exterior face 18 employing an ordinary automotive type spray gun. The amount of spray is determined by color. With the carbon black dispersed into the solvent-adhesive system, the surface turns darker gray as spray material is applied. The evenness of application can be determined by the evenness of the gray color. If weight is no problem, a moderate coat is sprayed on all over, as in automobile paint spraying. If weight is a problem, a witness specimen is positioned adjacent the surface being sprayed and the witness specimen is sprayed the same amount as the surface 18. When it is thought that the proper coating is applied, the witness specimen is cured, for example, under a heat lamp, and is tested. The desired resistance value in this use is about $6 \times 10^5$ ohms per square. If the test shows that an inadequate film had been applied, more is thereupon sprayed on surface 18. The testing may be continued with additional original witness specimens until the value is in the correct range. It is important to put the several layers of spray on before the layer thereunder is cured.

After the spraying to the proper value is complete, the material is cured. The two part system is mixed so that curing will occur at room temperature. The epoxy cure can be accelerated by radiantly heating the exterior face sheet 120° to 150° F. for four hours.

EXAMPLE 2

In this example, a two part urethane polymer resin system is employed instead of the epoxy polymer system of Example 1. Mixture 1 as made by mixing together 20 parts by weight of xylene with 0.03 parts by weight of acetylene carbon black and from 0.003 to 0.01 parts by weight of KR 9S coupling or wetting agent. This is mixed in a high shear power blender with a shear rate sufficiently high to maintain a one-half to one inch vortex. The carbon black is suspended in the xylene and the wetting agent helps maintain the dispersion. Mixture 2 is one-half part by weight of a two part urethane paint. Chemglaze gloss black is a commonly available paint of such nature. Mixture 1 is added to mixture 2 and is stirred with low shear mixing, such as a wooden paddle. Immediately upon mixing, this solution-dispersion is sprayed onto the exterior surface 18, tested and cured in the same manner as described in Example 1.

EXAMPLE 3

A silicone system can be applied to place and retain the carbon black. In this case, mixture 1 is formed of 20 parts by weight of toluene with 0.03 parts by weight acetylene carbon black and from 0.003 to 0.01 parts by weight KR 9S coupling or wetting agent. Mixture 1 is mixed together in a high shear power blender with shear sufficiently high to maintain a one-half to one inch vortex. Mixture 2 is 1 part by weight of a silicone crosslinking polymer resin system of which Dow Chemical Co. DC 93500 is typical. When mixture 2 is produced, mixture 1 is added thereto by means of low shear mixing, such as stirring with a wooden paddle. In this system, also, the wetting agent helps maintain the carbon in dispersion. When mixing is complete, the spray mixture is sprayed, tested and cured as described in Example 1.

The solution is immediately sprayed onto the exterior surface 18. When the exterior face sheet 12 is a woven fabric as illustrated, the conductive coating penetrates to the aluminum honeycomb 14 to provide a conductive path from the exterior surface to the honeycomb. The honeycomb 14 is connected to ground to discharge the current. Since the coating penetrates into the woven fabric of exterior face sheet 12, it is not shown as a separate layer but is shown as coating 20 of a darker character. The coating 20 is positioned over so much of the exterior face sheet 12 as is desired for the discharge of surface charging. The same coating and spray method can be used upon a nonporous dielectric film such as a continuous polyimide sheet. In that case, current conduction is through the surface coating, rather than through to metallic honeycomb core. In such a case, a portion of the surface area is grounded so that the surface can be dissipated.

In those cases where flexibility is desirable, the silicone system of Example 3 can be sprayed onto a flexible fabric to close the pores of the fabric, create electrical conductivity in the fabric and provide a flexible structure which can joint parts having a small amount of relative motion. One example of a suitable use of this structure is as a shield under the antennas on one end of a spacecraft. In that application, the color can control internal temperatures while the conductivity of the sheet acts as a ground plane for the antennas.

This invention has been described in its presently contemplated best mode, but it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A process of providing a conductive coating on a substrate of dielectric fibers comprising the steps of:
   mixing together by high shear mixing a first mixture of carbon black in solvent;
   mixing the first mixture into thermosettable resin polymer with hardener by low shear mixing wherein the mixing is sufficiently low shear as to incompletely coat the carbon black particles with thermosettable resin polymer to form a spray solution;
   cleaning the substrate of dielectric fibers; and
   spraying the spray solution onto the substrate of dielectric fibers wherein the substrate is supported on a metallic support and causing the solvent to evaporate and the resin to thermoset so as to provide an electrically conductive coating to produce a coating, having a resistance of about $6 \times 10^5$ ohms per square to reduce potential gradients wherein the coating extends through the fibers to the metallic support to provide electrical conduction away from the surface of the substrate.

2. The process of claim 1 wherein a dispersing agent is also mixed into the first mixture during the high shear mixing step.

3. The process of claim 2 wherein the solvent is acetone and the resin is epoxy.

4. The process of claim 2 wherein the solvent is toluene and the resin is silicone.

5. The process of claim 2 wherein the solvent is xylene and the resin is urethane.

6. The process of claim 3 wherein said first mixture is produced by mixing together 20 parts by weight of solvent and 0.03 parts by weight of carbon black to each part of resin.

7. The process of claim 4 wherein said first mixture is produced by mixing together 20 parts by weight of solvent and 0.03 parts by weight of carbon black to each part of resin.

* * * * *